United States Patent [19]

Kornmann

[11] Patent Number: 4,948,406
[45] Date of Patent: Aug. 14, 1990

[54] APPARATUS AND PROCESS FOR FORMING AN OPTICAL FIBRE COVERED BY A METALLIC SLEEVE

[75] Inventor: Michel Kornmann, Grand-Lancy, Switzerland

[73] Assignee: Battelle Memorial Institute, Carouge/GE, Switzerland

[21] Appl. No.: 249,188

[22] PCT Filed: Dec. 9, 1987

[86] PCT No.: PCT/CH87/00167
§ 371 Date: Aug. 12, 1988
§ 102(e) Date: Aug. 12, 1988

[87] PCT Pub. No.: WO88/04284
PCT Pub. Date: Jun. 16, 1988

[30] Foreign Application Priority Data
Dec. 13, 1986 [CH] Switzerland ............ 4959/86

[51] Int. Cl.⁵ .............................................. C03C 25/04
[52] U.S. Cl. ........................................ 65/3.11; 65/3.3; 65/10.1; 65/12
[58] Field of Search ............ 65/1, 3.11, 3.12, 3.3, 65/12, 13, 10.1; 427/163, 169; 118/405, 420

[56] References Cited

U.S. PATENT DOCUMENTS

| | | | |
|---|---|---|---|
| 2,928,716 | 3/1960 | Whitehurst et al. | 65/3.3 |
| 4,606,608 | 8/1986 | Wysocki | 65/3.3 |
| 4,812,150 | 3/1989 | Scott | 65/3.3 |

FOREIGN PATENT DOCUMENTS

| | | | |
|---|---|---|---|
| 47-51924 | 12/1973 | Japan | 65/3.3 |
| 0188429 | 11/1982 | Japan | 65/3.3 |

OTHER PUBLICATIONS

Chemical Abstracts, vol. 101, Nr. 10-Sep. 1984 (Columbus, Ohio U.S.), see page 301, Abstract 77645a, & JP,A,5952203 (Fujikura Cable Works Ltd.), Mar. 26, 1984.

Patent Abstract of Japan, vol. 10, Nr. 103 (C-340) (2160), Apr. 18, 1986 & JP, A, 6023957 (Shinkou Kousen Kogyo K.K.), Nov. 21, 1985.

Primary Examiner—Peter Kratz
Attorney, Agent, or Firm—Cushman, Darby & Cushman

[57] ABSTRACT

The optical fibre to be protected is dipped into a bath of molten metal which solidifies on contact with the fibre and forms the desired sleeve. The fibre passses through dies immersed into the bath and of which the spacing is adjustable so as to vary the distance along which the fibre is in contact with the molten metal and, consequently, the thickness of the sleeve.

14 Claims, 1 Drawing Sheet

APPARATUS AND PROCESS FOR FORMING AN OPTICAL FIBRE COVERED BY A METALLIC SLEEVE

The invention relates to a process for covering an optical fiber with a metallic sleeve, particularly an aluminum sleeve.

It is known that it is desirable to protect the optical fibers from corrosion caused by atmospheric agents which gradually impair their light transmission properties and their resistance qualities with respect to mechanical forces. An aluminum sleeve of a thickness of from 10 to 150 μm, preferably deposited by Passing the fiber through melted aluminum which adheres to the fiber and solidifies on contact, constitutes a good protection.

Thus the J-57 106.542 (FURUKAWA) text describes the stripping of optical fibers (for example, by burning their protective organic-resin sleeve) and covering them with aluminum by passing them through a bath of this melted metal.

The J-57 071.840 (FURUKAWA) text describes the covering of optical fibers with metals by means of an extrusion process according to which the covering metal (Al-Cu alloy) is maintained in a semi-melted phase (in which the proportion of the solid phase is 80-90%). In this case, the temperature at which the fiber is put in contact with the melted metal is reduced as much as possible, since this elevation of temperature has a negative influence on its mechanical qualities.

The J-58 074.543 (FUJITSU) text discloses the circulating of an optical fiber in a melted-metal bath (Sn, Al, etc.), with the object of covering it by depositing this type of a metal, the thus covered fiber being instantly cooled by sprinkling with cold water or by a gas current.

The J-58 027.977 (FURUKAWA) document describes the plating of filamentous materials, particularly optical fibers. According to this process, a heatable tube is placed on the surface of a melted-metal bath contained in a double-walled crucible; the metal is heated above its melting point, and the tube is heated to a temperature that is slightly above that of the melted metal; then the filament is circulated in the tube while the pressure is reduced there in order to promote an evaporation in a vacuum. Thick metallic covering layers are obtained by means of this technique.

The J-58 045.133 (FUJITSU) text discloses the depositing of metallic films on optical fibers as soon as they are drawn. The used metals contain Al and Sn. Cu prevents the oxidizing of the metal by acting under the protection of an inert gas, such as nitroqen or arqon. The thus obtained fibers exhibit low losses with respect to the transmission and a high tensile strength.

The J-58 045.134 (FUJITSU) text describes the covering of optical fibers with metals, in which case the used process includes putting the fibers coming out of the drawing furnace in contact with a current of hot gas. This gas current, which is applied to the fibers while the covering metal is still liquid, makes it possible to control the thickness and the uniformity of the covering and results in fibers with low losses with respect to transmission.

The J-59 035.046 (FUJITSU) describes the application of a metallic covering to optical fibers by passing them through a nose piece or nozzle containing melted metal and subjecting it to ultrasonics. This treatment is suitable for freshly drawn fibers and furnishes adhering metallic films which can be welded, which permits the connecting of the fibers among one another.

The J-60 194.041 (SUMITOMO) text teaches the covering of optical fibers with a metallic film by passing them, under a reduced pressure, through melted metal, the temperature of the fiber being lower than or equal to that of the melted metal. After the depositing of the melted metal, the fiber is passed through a wire gauge.

Although the techniques of the prior art permit the solving of a large number of problems concerning the plating of optical fibers with melted metal, certain problems remain nevertheless, or rather, certain suggested solutions are difficult to apply and should be simplified. In particular, the control of plating conditions is always difficult to implement as well as the uniformity of the thickness and the regularity of the deposit. It is particularly difficult, in view of the respective temperatures of the fiber and of the melted metal, to ensure a good contacting time between these two elements so that the metal adheres well to the fiber and solidifies there in the form of a homogeneous sleeve of an even thickness.

The process of the present invention, as summarized in claim 1, constitutes a step toward improving and simplifying the technique of covering quartz or glass fibers with a protective metallic sleeve.

A device, which permits the implementation of the present process, is described in claim 11.

An embodiment of this type of a device is shown, in the form of a schematic section, in the attached drawing to which reference is made according to the description.

Figure 1:
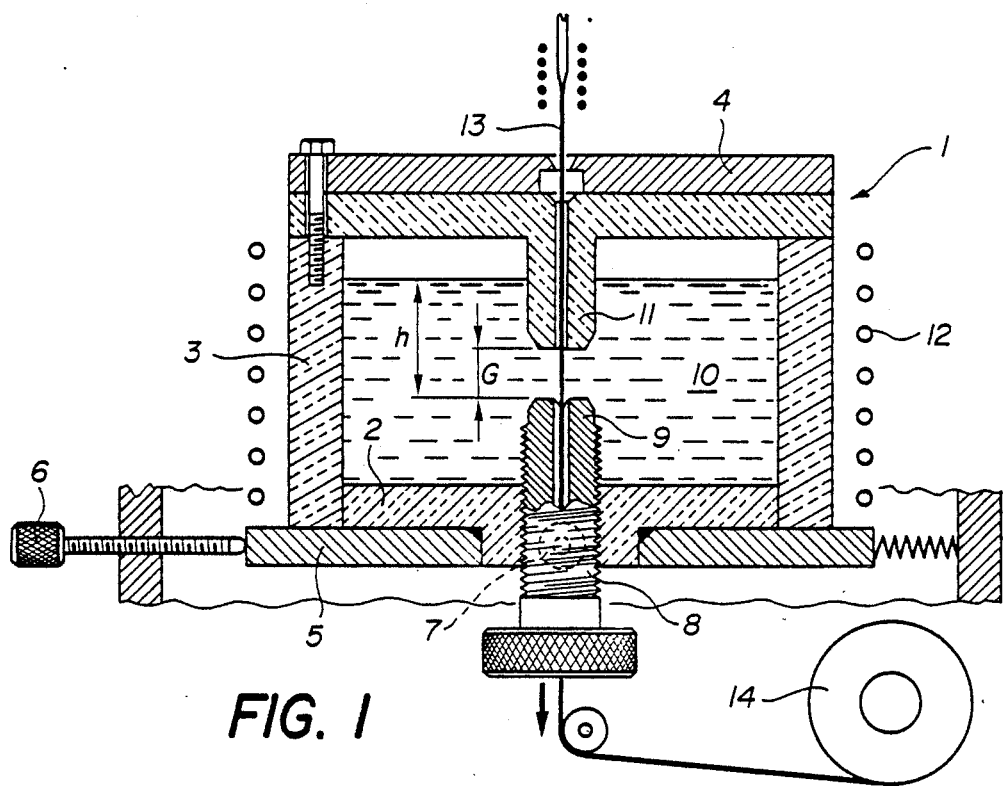
FIG. 1 represents a crucible provided with vertical dies for covering an optical fiber with a protective metallic sleeve.

The device of FIG. 1 consists of a crucible 1 delimited by a bottom 2, walls 3 and a cover 4. This crucible stands on a horizontal table 5 which can be moved longitudinally and transversely by a play of micrometrical screws 6 and 7. The bottom of the crucible is pierced and tapped for receiving a threaded die 8, the truncated nose piece 9 of which penetrates into the interior of the crucible 1. This is filled with melted aluminum 10.

The crucible contains another die 11 disposed in the cover 4 and axially opposite the nose piece 9 of the die 8. By means of the play of the screw thread of the latter, the level of the nose piece 9 can be shifted, i.e., the depth h at which it is dipped in the melted metal as well as the distance G between the flat parts of the nose pieces of the two dies; the die 8 can be adjusted until it touches the die 11 (G=0).

The present device also contains a heating winding 12 for maintaining the aluminum in a liquid state. Furthermore, a drawing system for an optical fiber (not shown, but conventional) furnishes an optical fiber 13 which can be circulated throuqh the dies 8 and 11 and wound on a storage attachment which is shown schematically by means of a drum 14. It will be noted that, in order to avoid that the just drawn fiber comes in contact with air, the fiber can be protected by means of a dry or inert gas, such as argon.

Figure 2:
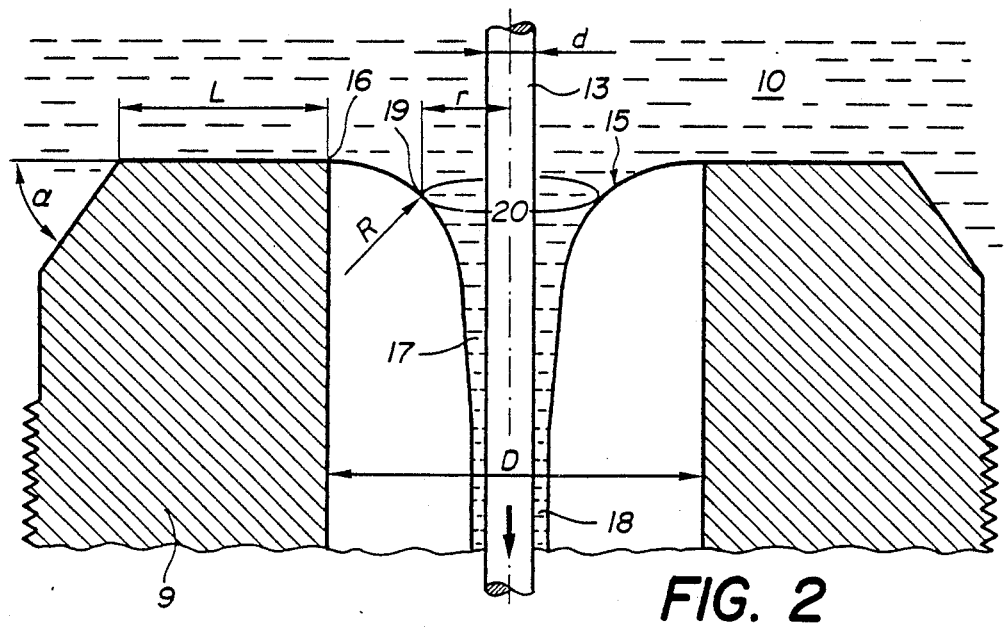
FIG. 2 is an enlarged detail of one of the dies of the crucible of FIG. 1.

FIG. 2, at a very enlarged scale, shows the mouth of the nose piece 9 of the receiving die during the operation of the covering device. In brief, the metal is melted in the crucible and maintained in the melted state at a temperature provided by means of the heating device 12. A fiber 13 is drawn, for example, from a rod preform (not shown) and is circulated in the dies 8 and 11 with the inside diameter D, the die 8 having previously been screwed in completely in order to touch the die 11. Then, after having carefully centered the fiber by means of the play of the adjusting devices 6 and 7, the die 8 is gradually unscrewed until a space G is created between the dies, in such a manner that the melted metal comes in contact with the fiber 13 having the diameter d which moves in the direction of the arrow. This movement, in the metal that is in the melted state, creates a meniscus 15 in the form of a "vortex" or of a funnel, the edge 16 of which fits the mouth of the nose piece 9 and the rod 17 creates and lengthens the protective sleeve 18 of solidified metal which surrounds the fiber 13 at the outlet of the die 8. The generating line 19 of this meniscus in the form of a "vortex" forms a variable curve, the minimum radius R of which relates to an annular region 20 placed at a distance r from the axis of the system.

These parameters are interesting for the following reasons: In order to avoid that the melted metal leaks between the fiber and the walls of the guide of the die 8 (or in other words, in order to form a protective sleeve of solidified metal that is straight and uniform), it is necessary, according to the laws of surface tension, that the hydrostatic pressure $\rho gh$, which prevails at the level of the nose piece 9, does not exceed the value given by the relation $\sigma (1/r + 1/R)$.

It may be admitted that R is the middle between $D/2$ and $d/2$. For example, if d amounts to 100 $\mu m$ (0.1 mm) and $D = 0.4$ mm, r is close to 0.1 mm. For a circulating speed of the fiber of 30 m/min. (50 cm/sec.), R is approximately 0.2 mm, resulting in $1/r + 1/R = 150$ cm$^{-1}$, and, in the melted aluminum ($\rho = 2.7$; $\sigma = 914$ d/cm), $h \leq 914 \times 150/2.7 \times 981 \simeq 52$ cm. The advantageous operating depth in the melted aluminum is therefore 1.5 to 10 cm. However, h may be higher or lower than this range.

It must be pointed out, however, that this type calculation must be carried out while taking into account the dynamic factor created by the movement of the fiber itself.

A "pressure" of this type is given by the relation $\rho v^2/2$ wherein v is the speed of the fiber in cm/sec. In the above-mentioned case, the following will therefore exist: $h = v^2/2 g = 1.3$ cm, which is negligible in proportion to the above-calculated values of h.

Generally, it was found that, for covering an optical fiber of a gauge of 50 to 200 $\mu m$, a die must be used, the inside diameter of which is understood to be between 200 and 1,000 $\mu m$. The operation advantageously takes place at a depth h of 2 to 10 cm. By varying G, the distance between the truncated flat parts of the dies, between approximately 0.5 and 5 mm, the thickness of the aluminum sleeve may be adjusted between approximately 10 and 150 $\mu m$.

It should be pointed out that if, in principle, it is advantageous to leave as little play as possible between the fiber and the guide of the die, the distance D-d being 50-750 $\mu m$ and it should not be less than approximately 20-100 $\mu m$; in fact, below that, the centering of the fiber is extremely difficult.

Furthermore, the possible tendency of the metal to form leaks and irregularities in the die 9 can be counteracted (in the event that a significant play is arranged between it and the fiber) by applying a low gas pressure upstream of the die 11 or an excess pressure downstream of the die 8, the crucible then being part of a tight chamber containing an upper compartment (where the fiber is delivered) and a lower compartment where the covered fiber is stored. The work may take place in an inert atmosphere (nitrogen, argon, etc.) or in air, the excess pressure relating to the upper compartment and the low pressure relating to the lower compartment. Pressure variations of from 0.05 to 0.5 bar are appropriate.

In the present process, the preheating of the fiber before the plating is not critical. Generally, when the drawing station is located at a sufficient distance from the crucible, for example, between 0.5 to 2 m, the fiber, by means of cooling, acquires a temperature that is suitable for its covering by means of the aluminum. If this is not the case, for example, when the fiber is not drawn in situ, a preheating to 300°–400° C. may be provided before the plating. Preferably, the temperature difference $\Delta T$ between the fiber and the melted metal is between 100° and 650° C.

The temperature of the melted aluminum must be controlled within certain limits. It may vary, for example, between 660 and 750° C., but the results are not identical for all values within this range. At lower temperatures, the solidifying may be too fast and the deposit may become irregular or even block the passage of the fiber. At temperatures that are too high, the covering is too thin or has a tendency to run. The preferred temperature range is between 663° and 690° C.

The present process applies to the covering of optical fibers made of quartz or another transparent mineral of a fixed or radially variable index of refraction. It is also applicable to other mineral fibers in so far as their mechanical resistance is sufficient at the temperatures of the melted metal bath.

In addition, other metals are also suitable in the melted state, such as Sn, Pb, Cu, Ni, ag, etc., as well as their alloys with or without aluminum. The operating parameters can, of course, be modified according to the melting temperature and the physical properties (viscosity, surface tension) of each considered metal or alloy. The filling of the crucible may be carried out discontinuously or continuously. In the latter case, the supplying of the metal takes place in the form of a wire, the progressive melting of which adjusts the metal deposited on the fiber and the output of which maintains the level of the liquid constant in the crucible.

It will be noted that in the construction of the dies shown as an embodiment in the drawing, the width L of the flat portion of the frustrum of the cone of the dies may be between approximately 0.5 and 5 mm; the angle of the slope of the truncated portion may be between approximately 40° and 75°. In order to cool the fiber at the outlet of the receiving die 8, ambient air or a jet of cooling air or of cooling liquid may be used.

The following examples illustrate the invention.

The operation was carried out by means of a unit consisting of a station for drawing glass fibers from a preform, i.e., a HERASIL-I-type silica rod (Heraeus, Wisag), of a diameter of 12 mm and a length of 50 cm which was drawn by means of a conventional model induction furnace (drawing temperature 2,000° to 2,200° C.).

For the plating, a graphite crucible was used, like the one shown in the drawing (placed at a distance of 1.20 m from the drawing station) containing 250 g of aluminum. The dies 8 and 11 are machined of a special ceramic material of the "MACOR" type which does not absorb the melted aluminum and is not corroded by it.

The upper die is fixed; the lower die 8 can be adjusted with respect to height (by varying G between zero and approximately 10 mm), as a result of its screw thread; this die can be turned by acting upon the hexagonal head 21. The interior guide of the dies has a diameter of 0.5 mm.

First, the dies are brought together until they touch one another by means of their plane face; then the aluminum is melted (power of furnace 12=4 KW); and then its temperature is adjusted. The fiber is then passed into the die at the selected speed and is rolled onto the drum 14, the fiber supporting itself on a pulley which is not shown in the drawing. Then the dies are separated by unscrewing the die 8 to a selected value in such a manner that the melted aluminum is deposited on the fiber and surrounds it as the desired sleeve. In order to interrupt the formation of the sleeve, the dies are brought together again. In general, in view of the speed of the drawing of the fiber, the time period during which it is in contact with the melted metal between the dies is from $10^{-2}$ to $10^{-4}$ seconds.

The following table summarizes the operating parameters used for a series of tests numbered 1 to 7 as well as the obtained results. The values of the table concern, in the order listed: the No. of the test; the diameter in $\mu m$ of the fiber subjected to the covering; the speed of its drawing in m/min.; the value in mm of the distance G between the dies; the contact time, in milliseconds, between the fiber and the melted metal; the temperature of the latter in °C.; the thickness of the sleeve in $\mu m$; and the breaking load of the covered fiber in N/mm².

| 1 | 130 | 30 | 1.87 | 3.7 | 666–669 | 20 | 2,044 |
| 2 | 130 | 30 | 1.87 | 3.7 | 661–662 | 20 | 2,414 |
| 3 | 135 | 50 | 2.25 | 2.7 | 673 | 20 | 1,364 |
| 4 | 180 | 30 | 2.25 | 4.5 | 667 | 20 | 1,360 |
| 5 | 130 | 50 | 2.25 | 2.7 | 663 | 20 | 1,580 |
| 6 | 134 | 30 | 1.87 | 3.7 | 676 | 17 | 2,032 |
| 7 | 120 | 30 | 4.5 | 9.0 | 685 | 15 | 2,978 |

In addition, the thus covered fibers were subjected to a corrosion test by rolling them on mandrels (diameter 6 and 9 mm) and by subjecting them for 10 days to a 60° C. temperature in a moist atmosphere at the ratio of 90% (relative humidity). After this time, the controls were all broken, whereas the protected fibers had resisted the corrosion.

I claim:

1. A process for depositing on a freshly drawn optical fiber of the diameter d a protective aluminum metal sleeve, according to which this fiber, in a symmetrically centered manner, is passed through two dies with a truncated nose piece partially wetted by melted metal, one of which being the supplying means and the other one being the receiving means, and being vertically and coaxially superposed opposite one another and immersed in a melted-aluminum bath at a distance from one another that is sufficient for having the melted metal come in contact with the fiber in the space located between the plane faces of the nose pieces of the dies and solidifying by contact with the fiber to form said protective sleeve, characterized in that, since the dies are axially movable with respect to one another, they are first reunited by means of their plane face, then the metal is liquidified, the fiber is set into circulation through the dies at a speed of 5 to 200 m/min. and these dies are progressively separated from one another until the distance between the dies, a value G is between 0.5 and 5 mm, the distance D-d between the fiber and the bore of the dies being 50 to 750 $\mu m$, such that said sleeve is formed, the thickness of the sleeve being 10 to 150 $\mu m$.

2. A process according to claim 1, the melted aluminum forming, on contact with the fiber, a meniscus and funnel the edge of which is at the same level as the mouth of the nose piece of the receiving die and the lower end of which, where the solidifying of the sleeve takes place, is joined to the latter, characterized in that, in order to avoid leaks of the melted metal at the outlet of the receiving die, the distance r between the axis of the die and the annular zone where the meniscus has the most pronounced curve is smaller than the radius of the curve R of this zone.

3. A process according to claim 2, characterized in that the mouth of the receiving die is immersed in the melted metal at a depth h of 1.5 to 10 cm.

4. A process according to claim 1, characterized in that the temperature of the melted aluminum is maintained between 660° and 750° C.

5. A process according to claim 4, characterized in that thickness of the covering sleeve varies as a function of the temperature of the aluminum bath and of the distance G between the dies.

6. A process according to claim 4, characterized in that the temperature difference $\Delta T$ between the fiber which comes in contact with the melted metal and the metal is between 100° C. and 650° C.

7. A process according to claim 1, characterized in that the optical fiber is drawn from a rod preform.

8. A process according to claim 1, characterized in that the gas pressure around the fiber in the delivering die is lower than that existing in the receiving die.

9. A process according to claim 1, characterized in that the melted metal bath is fed continuously by a wire of this metal which progressively penetrates the bath in proportion to its melting.

10. A process according to claim 1, characterized in that, at the outlet of the receiving die, the fiber is cooled and, for the purpose of storage, is wound onto a mandrel.

11. A Device for depositing a protective aluminum sleeve on a freshly drawn optical fiber comprising the following elements,
  (a) a graphite crucible filled with aluminum metal and provided with devices for melting this aluminum and maintaining it in a melted state, this crucible having a bottom and a pierced cover adapted to receive dies, which respectively receive and deliver an optical fiber which moves through them,
  (b) a horizontal support of the crucible in the form of a table which can be moved longitudinally and traversly by micrometrical devices and permits a positioning of the crucible,
  (c) dies with a truncated, a frusto-conical nose piece, made of a material that cannot be absorbed or can be only partially wetted by the melted metal, fitting into the holes of the bottom and of the cover of the crucible respectively, in such a manner that they are axially opposite in the interior of it, at lease one of them being able to be axially moved with respect to the other one until it touches it,
  (d) devices for producing, by means of hot-drawing, the formation of an optical fiber, devices for circulating this fiber through said dies such that, in the space between them, it comes in contact with the melted metal, and by means of the solidifying of this metal, it is covered by a protective layer, and devices for cooling the fiber thus plated and for winding it on a support.

12. A device according to claim 11, wherein the devices for maintaining the metal in a melted state in the crucible are constituted by an induction furnace.

13. A device according to claim 11, characterized in that the material of the dies is a machinable ceramic having the tendency to completely or partially repel the melted metal.

14. A device according to claim 11, characterized in that the angle of the slope of the frustrum of the cone of the dies is between 40° and 75°.

* * * * *

UNITED STATES PATENT AND TRADEMARK OFFICE
CERTIFICATE OF CORRECTION

PATENT NO. : 4,948,406
DATED : August 14, 1990
INVENTOR(S) : KORNMANN et al

It is certified that error appears in the above-identified patent and that said Letters Patent is hereby corrected as shown below:

Column 5, line 67, change "a value G" to -- a value G, --.

Column 6, line 54, change "traversly" to --transversely--.

line 61, change "at lease" to -- at least --.

Column 7, line 1, change "metal, it" to -- metal it --.

Signed and Sealed this

First Day of September, 1992

Attest:

DOUGLAS B. COMER

*Attesting Officer*      *Acting Commissioner of Patents and Trademarks*